July 18, 1944.   P. V. PALMQUIST   2,354,048
FLEXIBLE LENTICULAR OPTICAL SHEET
Filed Aug. 3, 1940
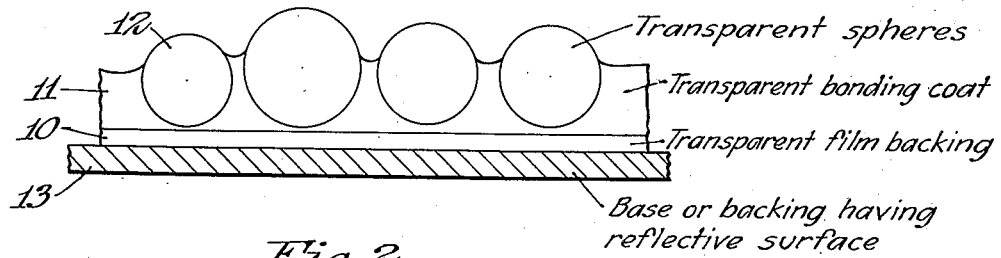
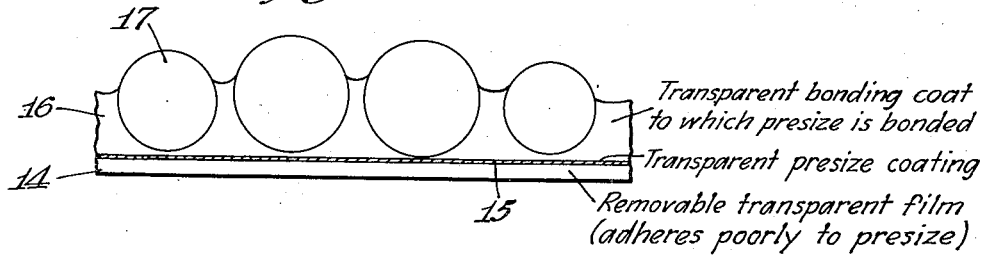
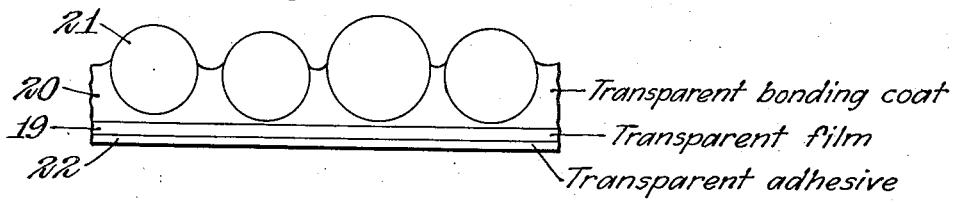
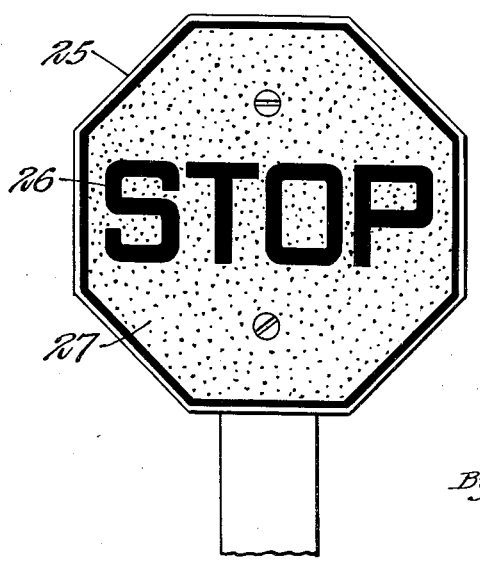
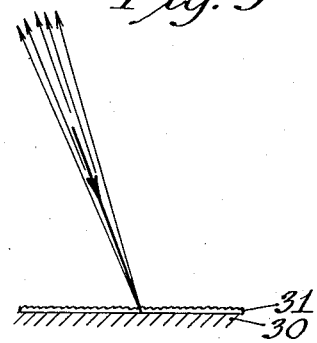
Inventor
Philip V. Palmquist
By Carpenter, Abbott, Coulter & Kinney
Attorneys Patented July 18, 1944

2,354,048

UNITED STATES PATENT OFFICE 2,354,048

FLEXIBLE LENTICULAR OPTICAL SHEET

Philip V. Palmquist, Minneapolis, Minn., assignor to Minnesota Mining & Manufacturing Company, St. Paul, Minn., a corporation of Delaware Application August 3, 1940, Serial No. 351,168

9 Claims. (Cl. 40—135)

This invention relates to flexible, self-sustaining, transparent sheets of lenticular nature wherein one face has a multiplicity of contiguous small convex lens elements.

An object of the invention is to provide a transparent sheeting which may be applied over a light reflective surface, which may have a design or indicia thereon as in the case of a sign, to modify the reflection of incident light to produce "reflexive" reflection.

By "reflexive" reflection, I mean that a ray of incident light striking at an angle is largely returned in a small-angle cone of light in the same path, so that the reflected light is concentrated about the line of incident light. This is to be distinguished from diffuse reflection in which the intensity distribution is about the same over a wide angle, such as results when a ray of light strikes the surface of blotting paper; and from the reflection obtained from a plane polished metal surface in which the incident light ray is reflected as a ray at an angle equal to the angle of incidence but on the other side of a line drawn normal to the surface at the point of incidence. In the first case, the diffusion of light over a wide angle greatly reduces the intensity of that directed toward the observer. In the second case, an observer must be located substantially on the line of the reflected ray in order to see the light, intense as it may be. But where "reflexive" reflection occurs, the observer may be at a small angle from the line of incident light, and the light may strike the reflector at an angle, and yet he will be within the cone of reflected light which is of high intensity. This means, for example, that the driver of an automobile whose headlights illuminate the reflexive reflector, even though at an angle, will be able to see the reflected light at a great distance.

The present invention permits of converting an ordinary sign into one of the reflexive type by simply covering the sign with the transparent sheet which I provide to render such sign visible at a greater distance when illuminated by light which approaches the sign in a direction approximately the same as the path which reflected light must follow to reach the observer. Thus highway signs may be rendered visible to approaching motorists when they are much farther away. But due to the transparency of the covering sheet, and its optical properties, it will not conceal the sign when observed by ordinary daylight or other diffused illumination, and in fact the ordinary observer will not notice any particular difference under such conditions.

The sheet material may, however, be printed or coated on its back or face surface, in letters, numerals or other indicia or designs, to "black out" or color particular areas, and be cemented (by a transparent material) to a reflective base or backing, or mechanically fastened thereover, to provide a sign or the like. Opaque coating will produce dark indicia surrounded by a background reflecting light, whereas a tinted transparent coating will cause incident light to be reflected as colored light at the coated areas. Combinations of these expedients may be used so that certain areas will reflect no light and other areas will reflect colored light. The sheet itself may be tinted or made from tinted materials to color reflected light. The preformed sheet may be laminated to a printed paper or metal foil to provide a flexible sign sheet which is self-contained, or be itself printed on one or both faces and laminated to a uniformly reflecting backing, or a combination of these expedients may be used.

A further object is to provide a transparent covering sheet or wrapper which may be applied to packages, calendars, book covers, etc., for producing novel display or advertising characteristics, as the underlying surface will not be concealed under ordinary illumination and will show brilliantly when illuminated by light approaching from the general direction of the observer. Thus effective window displays can be made which will show up brilliantly at night.

A further object is to provide a sheet material of this character which is soft and stretchable and may readily be conformed to embossed or irregular surfaces to which applied.

An object is to provide a flexible sheet material which may be fabricated in continuous webs and wound in rolls of suitable size for shipment to purchasers, thus reducing costs and making for convenience of use. A further object is to provide a sheet which may be manually cut to desired shapes by means of shears or knife, or may be mechanically cut by inexpensive die cutting machines or by band saws which simultaneously may cut out a large number of stacked sheets.

Still another object is to provide sheet material provided with an integral transparent adhesive coating on the back, so that the sheet is in ready-to-lay form and may be smoothly and firmly adhered to surfaces.

A further object is to provide a sheet which is weatherproof and may be used in making outdoor signs of a permanent nature without frequent replacement being required.

The lenticular sheet of this invention may be made by providing a coating of small transparent contiguous glass beads (or the equivalent) bonded to a transparent self-sustaining flexible supporting sheet, so that the beads are partially embedded in a transparent bonding medium, leaving the upper portions of the beads exposed as convex lens elements.

In the accompanying illustrative drawing:

Figs. 1, 2 and 3 are diagrams indicating, in magnified form, sections of transparent lenticular sheets;

Fig. 4 is a plan view of a highway "stop sign" over the surface of which has been applied a transparent lenticular sheet of the character described, for the purpose of producing "reflexive" reflection of incident light beams; and Fig. 5 is a diagram used in illustrating the nature of the "reflexive" reflection obtained when the transparent lenticular sheet is used.

Referring to Fig. 1, an illustrative embodiment of a flexible transparent lenticular sheet of the character described is formed of a transparent film backing 10 to which is united a transparent bonding coat 11 in which transparent spheres of glass or the like 12 are partially embedded to provide a lenticular surface constituted of a multiplicity of contiguous convex spherical lens elements. This combination constitutes a unitary self-sustaining sheet which may be wound in roll form and may be cut by the sign maker to desired size and applied over a sign surface, or it may be laminated to a reflective backing such as aluminum foil, and is thus adapted to various uses. The base or backing 13, having a reflective surface, to which the preformed sheet may be applied, generically represents any base or backing from which "reflexive" reflection may be secured by superimposing the transparent lenticular sheet.

The transparent spheres are shown spaced from the rear or back surface of the lenticular sheet since, as hereinafter described, this improves the brilliancy of reflected light as viewed by an observer on or near the axis of an incident beam of light.

Illustrative directions for making such a sheet are given hereinafter in Examples 1 and 2. Example 2 describes the making of a soft and stretchable sheet adapted to be closely conformed to a sign surface and which may be readily conformed to the surface of an embossed sign.

Fig. 2 illustrates a construction which may be made as described hereinafter in Example 3. A transparent film 14 has a thin transparent presize coating 15 applied to its surface of a character which permits of subsequent separation when desired, over which is applied a transparent bonding coat 16 in which the transparent spheres 17 are partially embedded, this bonding coat being of a character to form a firm bond to the aforesaid presize coating.

When this lenticular sheet is applied to a surface, the spheres will be spaced therefrom by a distance somewhat greater than the thickness of the transparent film 14 but, if desired, this film may first be stripped off, being removable by virtue of the nature of the presize coating.

Fig. 3 shows a lenticular sheet having a transparent film 19, transparent bonding coat 20 and partially embedded layer of transparent spheres 21, characterized by having a layer of transparent adhesive 22 united to the back surface of said film. This construction provides a transparent lenticular sheet of the character described which is in ready-to-lay form, so that the sign maker or other user does not need to employ a cement or other means of bonding the sheet to the sign or other base. The spheres will be spaced from the reflective surface of the sign or other base by the thickness of the film 19 and adhesive layer 22, plus the distance of the spheres from the surface of said film, and the total spacing distance can be adjusted to produce optimum brilliancy. The application of the adhesive layer by the manufacturer permits of securing greater uniformity in thickness and more accurate spacing than would result from the user cementing a sheet in place. This construction may be of the stretchable type to permit of closely conforming the lenticular sheet to surfaces to which applied.

Fig. 4 shows a highway "stop sign" illustrating a use of the lenticular sheeting. This sign is a regular embossed and enameled metal sheet 25, the lettering 26 being raised above the background level by embossing. In a typical sign of this kind, the raised lettering is enameled black and the background is enameled yellow. A transparent lenticular sheet 27 of the character described, preferably having an adhesive layer on the back and being ready-to-lay (see Fig. 3), and which for this purpose should be of the stretchable type, is applied over the face of the sign to cover it and is rolled and pressed down so as to conform to the surface irregularities and embossing.

The superimposed transparent lenticular sheet will not appreciably interfere with the normal appearance and visibility of the sign when viewed by diffused light, as during the day time. When viewed at night by occupants of approaching vehicles, the lights of which illuminate the sign, the sign will be visible and readable at far greater distances than would be true of ordinary stop signs, since the interposed lenticular sheet collimates the reflected light from an incident beam and selectively returns it toward its source in a brilliant cone. The yellow reflective background will thus stand out with a brightness many times greater than would be the case if the lenticular sheet were not present. The black lettering will of course continue to be black since it does not reflect light. The present invention thus provides a way by which existing signs can be readily and inexpensively converted to signs of the reflex type.

The diagram of Fig. 5 illustrates what is meant by "reflexive" reflection. In the case of a reflective surface 30 covered by a transparent lenticular sheet 31 of the character described, an angularly incident beam of light will pass through one or more of the spheres before reaching the reflective surface. The parallel rays will be refracted by the spherical lens elements and those passing through each element will converge upon the reflective surface, giving rise to emergent rays which will be collimated in passing out through the lens elements so as to be directed back toward the source of the incident light in a cone of brilliant light. Thus the reflected light is largely concentrated about the axis of the incident light; and is not dissipated by being diffused and reflected in other directions. The lenticular sheet thus acts as a refracting medium to modify the direction of the incident and reflected rays. If the lenticular sheet were not present, and even though the reflective surface has a diffusing effect (not being truly specular as with a perfect mirror), as in the case of the surface of a sign, only a small fraction of the reflected light would be directed back toward the source or in close proximity thereto, most of the light going off in other directions.

Various illustrative forms and materials of construction are illustrated by the following examples:

Example 1

A transparent web of cellulose acetate film of 2 mils thickness is coated on one side, as by using a doctor blade, with a 6 mil layer of polyvinyl acetate bead-bonding adhesive solution composed of a 40% solution in butyl alcohol of polyvinyl acetate (such as AYAF type made by Carbide & Carbon Chemical Co.).

The coated web, with the wet adhesive on top, is promptly carried under a hopper which feeds an excess of glass beads upon the surface. A batter may be provided beneath the web to agitate it so that the beads will fill in to form a closely packed and uniform layer and so that the beads will properly penetrate into the bonding coat and come substantially into contact with the surface of the cellulose acetate film. The web is then inverted, as by being drawn down around a roller, to cause the excess beads to fall off. The bonding coat may then be dried by driving off the solvent, as by being festooned on racks and passed through an oven or heating chamber to subject the web to say 150° F. for 1 hour. The resultant structure is illustrated in Fig. 1.

In this example the beads are of 80 mesh sizing (ranging from 6.7 to 9.4 mils diameter) and are made of glass having a refractive index of 1.50 to 1.55. The bonding coat has a refractive index of the same order. Before application, the beads are preferably cleaned by washing with a hot 5% solution of trisodium phosphate, followed by rinsing until alkali-free.

As the beads are nearly in contact with the cellulose acetate film, the spacing between the beads and a reflective surface to which the sheet may be applied, or which is applied to the back face of the film, is determined by the thickness of said film, which thus serves not only as a flexible backing but as a spacing member to cause the beads to be uniformly spaced from the reflector means. The focal point (which is really a zone in view of the optical properties of the spherical lens elements) of a light ray impinging upon a bead is located to the rear of the bead in the case of glass beads of ordinary refractive index. In the case of glass beads of about 1.5 refractive index, the most brilliant reflection occurs when the reflector surface is located behind the beads at a distance equal to about 20–40% of the diameter of the beads. The closer one approaches the optimum for brilliance of reflection, the smaller the angle of the cone of brilliant reflected light; and also in this case reflexive reflection does not occur when the incident light strikes the beaded surface at a large angle away from the perpendicular. In the case of highway signs set beside a straight road, the light from distant approaching cars will impinge at only a small angle from the perpendicular and maximum brilliance may be most desirable, as the sign will be visible from diffused light reflection when the driver has approached so closely as to have lost the benefit of reflexive reflection.

A wider cone of intense reflected light, and a wider angle of incident light which will produce reflexive reflection, can be secured by spacing the beads farther or closer than the aforesaid optimum, and this may be desired to produce a type of reflection best suited for certain purposes. In the present example, it will be evident that a change of spacing can easily be made by using a backing film of different thickness or by using beads of different diameter.

In general, beads of 20 to 200 mesh are preferred (about 3 to 50 mils diameter), with beads in the lower part of the range usually being most desirable.

The backing film may be printed or provided with coated areas, upon the side which receives the bead-bonding coat, for the purpose of blocking reflection or coloring the light within the areas involved, as an alternative to the previously mentioned expedients of printing or coating the beaded surface or the back surface of the completed sheet. Also, the surface of the film which receives the bead-bonding coat may have certain portions coated with a reflective material (such as a pigmented varnish), so that incident light will be reflected within the sheet at these places. In other words, the invention contemplates a transparent sheet, but this does not preclude reflection or blacking out in certain areas thereof nor preclude the application of a reflecting coating or layer to the back surface of the sheet.

Example 2

A transparent film sheeting of rubber hydrochloride (such as "Pliofilm") is coated with a bead-bonding coat and with glass beads as described in the preceding example, except the applied bonding coat solution has the following formula:

| | Parts |
|---|---|
| Polyvinyl butyral (such as "Butvar") | 25 |
| Tricresyl phosphate (plasticizer) | 2½ |
| Cellosolve (volatile solvent) (ethylene glycol monoethyl ether) | 72½ |

In this case, both the backing film and the bead-bonding coat are not only flexible but stretchable, facilitating conformation of the sheet to embossed or irregular surfaces.

As is well known, rubber hydrochloride films are thermoplastic and become adhesive on heating so that they can be laminated to base surfaces by hot-pressing.

Example 3

A web of cellulose acetate film, having a smooth glossy surface, is coated with a bead-bonding composition within which a layer of beads are embedded, as previously described, except that the coating solution is comprised of a mixture of:

(a) 4 parts of "Rezyl No. 53," a two-component liquid alkyd resin made by American Cyanamid & Chemical Corp., of the glycerine-phthalic anhydride type.

(b) 1 part of a urea-formaldehyde resin (for example, 2 parts of Beetle No. 227–8, made by American Cyanamid & Chemical Corp., which is a 50% solution of the resin in a solvent composed of 60% butyl alcohol and 40% xylol, in which case no other solvent is needed in making up the coating solution).

This coating requires heating not only for solvent removal but for setting up the resin, and 30 hours at 165°–175° F. is suitable.

The cellulose acetate film may be presized with a 10% solution in toluol of normal propyl methacrylate or isobutyl methacrylate (polymeric solid resins), and dried, to form a thin surface film, with the aforesaid resin coat then applied thereover. This presize adheres poorly to the cellulose acetate surface and hence the cellulose acetate film may be stripped from the beaded resin layer, by flexing the composite sharply at the margin to obtain a start and then pulling the two lamina apart. The presize remains as a thin film upon the resin layer. The resin layer (which is a cured urea-formaldehyde modified alkyd resin) then serves as a self-sustaining flexible film or sheet in which the beads are embedded to almost the back surface, and almost to the back surface of the size film, so that there is little spacing when this sheet is applied directly to a reflecting surface. The resultant structure is shown in Fig. 2. Alternatively, the size film may be made thicker to provide a real spacing coat.

The sheet may be sold with the removable cellulose acetate film in position, and the latter removed by the user when desired. Or, it may be preferred to leave the cellulose acetate film in position to serve as a spacer when the sheet is applied to a reflecting surface. This gives the user two choices as to the spacing factor.

Alternatively, the cellulose acetate film may be printed or coated with a reflecting or non-reflecting film which will preferentially adhere to the subsequently applied bead-bonding coat. The ink or coating composition may, for example, have a base of normal propyl methacrylate polymer resin into which pigment has been ground. Ultimate stripping off of the cellulose acetate film will leave such printing or coating united to the back of the bead-bonding layer. The resultant structure is as shown in Fig. 2, except that this printing or coating takes the place of the transparent presize coating 15.

In making up sheet material in accordance with this invention, it may be observed that the bead-bonding coat should extend to above the middle of the beads to secure maximum anchorage. Owing to capillarity, the bonding material may extend to a higher point on the beads than the surface level between the beads.

Prior to application, the beads may if desired be coated with a transparent film to further improve anchorage and weatherproofness. As an example, the beads may be coated with a solution of "A stage" Bakelite (hydrophilic), followed by heating to produce a film coating of "B stage" Bakelite (which provides a hydrophobic surface). A further example is to film the beads with plasticized polyvinyl butyral in a volatile solvent such as Cellosolve. After application and completion of the beaded sheet, the exposed parts of the films may be cleaned off the beads.

A transparent sizing coat may be applied over the beaded surface of the sheet to hold the beads more firmly in place and reduce the effects of weathering upon the bonding layer. This bead sizing should be thin so as to closely conform to the bead surfaces, and should be weather-resistant. An example of a suitable sizing is a plasticized polyvinyl butyral.

In referring broadly to the lenticular optical sheet as being "flexible," it is meant that the sheet can be wound upon cores of about 18 inch diameter or less and unwound to flat form without damage. All of the examples relate to preferred forms which can be wound upon 3 inch diameter cores or less.

For the purpose of this specification and claims, the term "weatherproof," as applied to the bonding coat or layer and to the sheet as a whole, may be defined as meaning that the sheet will stand at least a full year of outdoor exposure at Houston, Texas (facing south with 45° inclination) without suffering over 25% loss of beads, and without suffering such discoloration as will cause a loss of reflection efficiency of more than 25%. All of the examples given in this specification fall well within this definition. This criterion has been found to be the best so far known, as conditions at Houston are so severe that a substantially equal or lower rate of weathering occurs elsewhere, even when conditions are different (as for example at Saint Paul, Minnesota). A criterion based upon an accelerated laboratory test would be preferred, but thus far none has been found which correlates closely with outdoor weathering experience.

As previously mentioned, a transparent adhesive coating may be provided upon the back face of the transparent beaded sheet, as illustrated in Fig. 3. This may be of any type—solvent activated, heat activated, or normally tacky and pressure-sensitive. By way of illustration, an adhesive of the latter type may be comprised of latex crepe rubber blended with low-acid type ester gum in amount to produce the desired degree of tack, coated in a volatile petroleum solvent vehicle which is subsequently driven off by heating (for further details see Drew Patent No. 2,156,380, issued May 2, 1939). This tacky adhesive coating permits the sheet to be successfully wound into rolls and unwound without adhesive transfer, owing to the highly cohesive nature of the adhesive and the limited area of contact to the adjacent beaded surface.

Such adhesive coating, and also a cement coating where this is used to produce adhesion to a base or reflecting surface, will increase the spacing distance. This may be compensated for, if desired, through adjustment of the bead size or thickness of film backing to which the beads may be bonded, or both.

What I claim is as follows, including such equivalents as the nature of the invention and the state of the prior art permits:

1. In combination with a base having a reflective surface, an overlying preformed flexible transparent lenticular optical sheet of the character described, having a multiplicity of small transparent contiguous glass beads partially embedded in a transparent bonding medium to form a uniform surface layer thereof, said optical sheet causing "reflexive" reflection of incident light.

2. In combination with a base having a reflective surface, an overlying preformed flexible transparent lenticular optical sheet of the character described, having a flexible transparent film backing, a transparent flexible bead-bonding coat united thereto and a layer of small transparent glass beads partially embedded therein, substantially reaching said backing film and spaced by the latter from the reflective surface of the underlying base, said optical sheet causing "reflexive" reflection of incident light.

3. In a sign adapted for outdoor use involving exposure to weathering conditions, a base having a reflective surface forming a design or indicia and an overlying preformed weatherproof flexible transparent optical sheet of the character described, having a flexible transparent film backing, a transparent flexible weatherproof bead-bonding coat united thereto and a layer of small transparent glass beads partially embedded therein, substantially reaching said backing film and spaced by the latter from the surface of the underlying base, said optical sheet causing "reflexive" reflection of incident light.

4. In a sign having an embossed or irregular reflective surface forming a design or indicia, an overlying preformed flexible and stretchable transparent optical sheet of the character described, conformed to and contacting said surface, having a multiplicity of small transparent contiguous glass beads partially embedded in a transparent bonding medium to form a uniform surface layer thereof, said optical sheet causing "reflexive" reflection of incident light.

5. As a new article of manufacture, a flexible and stretchable transparent lenticular optical sheet of the character described, conformable to embossed sign surfaces, comprising a flexible and stretchable transparent bonding sheet having a layer of small transparent spheres partially embedded therein, adapted to produce "reflexive" reflection of light from reflective surfaces to which applied.

6. As a new article of manufacture, a flexible and stretchable transparent lenticular optical sheet of the character described, conformable to embossed sign surfaces, having a flexible and stretchable transparent film backing, a flexible and stretchable bead-bonding coat united thereto and a layer of small glass beads partially embedded therein and substantially reaching said backing film.

7. As a new article of manufacture, a flexible transparent optical sheet of the character described, having a multiplicity of small transparent contiguous glass beads partially embedded in a transparent bonding medium to form a uniform surface layer thereof, and having a coating of transparent adhesive upon the back surface for uniting the sheet to reflecting surfaces to produce "reflexive" reflection of incident light.

8. As a new article of manufacture, a flexible transparent lenticular optical sheet of the character described, comprised of a thin transparent film backing, an overlying self-sustaining flexible transparent sheet member having a layer of small transparent glass beads partially embedded therein and substantially reaching the back surface thereof, and an interposed sizing coating removably adhering the film backing and sheet member together so as to permit of stripping off the film backing if desired.

9. In combination with a base having a reflective surface, an overlying preformed self-sustaining flexible transparent lenticular optical sheet which is soft and stretchable and conforms to said surface, having a layer of small transparent spheres partially embedded in the front side of the sheet to provide a lenticular surface, the rear surfaces of the spheres being spaced from the back surface of the sheet which overlies the reflective surface, said optical sheet producing "reflexive" reflection of an incident beam of light striking through the sheet to the reflective surface.

PHILIP V. PALMQUIST.

DISCLAIMER 2,354,048.—*Philip V. Palmquist*, Minneapolis, Minn. FLEXIBLE LENTICULAR OPTICAL SHEET. Patent dated July 18, 1944. Disclaimer filed Jan. 15, 1947, by the assignee, *Minnesota Mining & Manufacturing Company*.

Hereby enters this disclaimer to claims 1, 2, and 3 of said patent.

[*Official Gazette March 4, 1947.*]